US006600406B1

(12) United States Patent
Ha

(10) Patent No.: US 6,600,406 B1
(45) Date of Patent: Jul. 29, 2003

(54) ELECTRONIC INFORMATION KEY SYSTEM

(75) Inventor: Jae Hong Ha, Seoul (KR)

(73) Assignee: Irevo, Inc., Seoul (KR)

( * ) Notice: Subject to any disclaimer, the term of this patent is extended or adjusted under 35 U.S.C. 154(b) by 0 days.

(21) Appl. No.: 09/424,457

(22) PCT Filed: May 22, 1998

(86) PCT No.: PCT/KR98/00127

§ 371 (c)(1), (2), (4) Date: Nov. 23, 1999

(87) PCT Pub. No.: WO98/53166

PCT Pub. Date: Nov. 26, 1998

(30) Foreign Application Priority Data

May 23, 1997 (KR) ............................................. 9-20216

(51) Int. Cl.[7] ................................................ G05B 19/00

(52) U.S. Cl. ........................ 340/5.2; 340/5.23; 340/5.6; 340/5.65; 340/5.7

(58) Field of Search ................ 340/5.2, 5.1, 5.21–5.23, 340/5.6, 5.65, 5.7, 5.71, 5.72, 5.73

(56) References Cited

U.S. PATENT DOCUMENTS 5,982,295 A * 11/1999 Goto et al. ............ 340/825.54
RE36,426 E * 12/1999 Wiik et al. .................. 235/382
6,331,812 B1 * 12/2001 Dawalibi .................... 340/5.2

FOREIGN PATENT DOCUMENTS

FR 2 729 700 A1 * 7/1996

* cited by examiner

*Primary Examiner*—Julie Lieu
(74) *Attorney, Agent, or Firm*—Pennie & Edmonds LLP

(57) ABSTRACT

The inventive electronic information key system comprises at least one electronic information key and a locking device unlocked with the electronic information key. The electronic information key includes: an ID code storage having a plurality of memory areas, each storing different ID codes; a body, resin-treated, for installing the ID code storage; and a contact, mounted on the body and electrically connected to the ID code storage. The locking device includes: a key holder for electrically contacting the contact of the electronic information key; a registered ID code storage for storing values corresponding to the ID codes stored in any one of the plurality of memory areas of the ID code storage of the electronic information key; a controller for comparing the ID codes stored in an area of the ID code storage with the ID codes stored in the registered ID code storage to thereby verify whether the electronic information key is duly operating, when the contact electrically contacts the key holder.

21 Claims, 10 Drawing Sheets

FIG. 5

| | | |
|---|---|---|
| address 1(number of regisered ID codes | 02 | 700 |
| address 2(ID code 1-1) | 5A | 710 |
| address 3(ID code 1-2) | FC | |
| address 4(ID code 1-3) | 00 | |
| address 5(ID code 1-4) | 00 | |
| address 6(ID code 1 start address) | 00 | 712 |
| address 7(ID code 2-1) | 5A | 720 |
| address 8(ID code 2-2) | FC | |
| address 9(ID code 2-3) | 00 | |
| address 10(ID code 2-4) | 01 | |
| address 11(ID code 2 start address) | 00 | 722 |
| • | • | |
| • | • | |
| • | • | |
| • | • | |
| • | • | |
| • | • | |
| • | • | |
| • | • | |
| address 124(master key code 1) | 12 | 730 |
| address 125(master key code 2) | 34 | |
| address 126(master key code 3) | 56 | |
| address 127(master key code 4) | 78 | |
| address 128(master key verification code) | 08 | 732 |

FIG. 6

| (A) | | (B) | (C) | (D) | (E) |
|---|---|---|---|---|---|
| address 1(ID code A-1) | 5A | 5A | 43 | 43 | 5A |
| address 2(ID code A-2) | FC | FC | 1C | 1C | FC |
| address 3(ID code A-3) | 00 | 00 | 70 | 70 | 00 |
| address 4(ID code A-4) | 01 | 01 | F9 | F9 | 01 |
| address 5(ID-A verification code) | A7 | A7 | D6 | D6 | A7 |
| address 6(ID code B-1) | XX | 2D | 0A | 0A | 35 |
| address 7(ID code B-2) | XX | 04 | FC | FC | 24 |
| address 8(ID code B-3) | XX | 98 | 00 | 00 | 0B |
| address 9(ID code B-4) | XX | 4F | 5A | 5A | 47 |
| address 11(ID-B verification code) | XX | FE | AC | AC | 5D |
| address 11 | XX | XX | XX | XX | XX |
| • | • | • | • | • | • |
| • | • | • | • | • | • |
| • | • | • | • | • | • |
| address 123 | XX | XX | XX | XX | XX |
| address 124 | XX | XX | XX | XX | XX |
| address 125 | XX | XX | XX | XX | XX |
| address 126 | XX | XX | XX | XX | XX |
| address 127 | XX | XX | XX | XX | XX |
| address 128(master key indentifying information) | 00 | 00 | 00 | 00 | 00 |

FIG. 7

| | (A) | (B) | (C) | (D) | (E) |
|---|---|---|---|---|---|
| address 1(number of regisered ID codes) | 02 | 02 | 02 | 02 | 02 |
| address 2(ID code 1−1) | 5A | 5A | 5A | 5A | 5A |
| address 3(ID code 1−2) | FC | FC | FC | FC | FC |
| address 4(ID code 1−3) | 00 | 00 | 00 | 00 | 00 |
| address 5(ID code 1−4) | 00 | 00 | 00 | 00 | 00 |
| address 6(ID code 1 start address) | 00 | 00 | 00 | 00 | 00 |
| address 7(ID code 2−1) | 5A | 2D | 43 | 43 | 35 |
| address 8(ID code 2−2) | FC | 04 | 1C | 1C | 24 |
| address 9(ID code 2−3) | 00 | 98 | 70 | 70 | OB |
| address 10(ID code 2−4) | 01 | 4F | F9 | F9 | 47 |
| address 11(ID code 2 start address) | 00 | 06 | 00 | 00 | 06 |
| | • | • | • | • | • |
| | • | • | • | • | • |
| | • | • | • | • | • |
| | • | • | • | • | • |
| address 124(master key code 1) | 12 | 12 | 12 | 12 | 12 |
| address 125(master key code 2) | 34 | 34 | 34 | 34 | 34 |
| address 126(master key code 3) | 56 | 56 | 56 | 56 | 56 |
| address 127(master key code 4) | 78 | 78 | 78 | 78 | 78 |
| address 128(master key verification code) | 08 | 08 | 08 | 08 | 08 |

ELECTRONIC INFORMATION KEY SYSTEM

FIELD OF THE INVENTION

The present invention relates to an electronic key system, and, more particularly, to an electronic information key system having an electronic information key for unlocking a locking device for use in an access restriction or a data communication.

BACKGROUND ART OF THE INVENTION

Conventionally, a mechanical locking system has been widely used for prohibiting an unauthorized person to have access thereto. This conventional mechanical locking system is implemented principally by matching a key to a locking device having a mechanical structure corresponding to the key. In using the conventional locking system, a number of keys are needed, more than one for each of a car, a house, a personal locker, a computer, a safe, etc. Therefore, a user should carry each of these keys and should be aware which key corresponds to which locking device, which is very inconvenient.

In order to alleviate the above-described inconveniences, an password-type electronic key system has been introduced. This password-type electronic key system, however, has disadvantages that the circuit thereof is complicated and, therefore, this key system is prone to a hitch because a keypad thereon including numerics 0–9 should be mounted on the locking device thereof. Further, the size of the keypad cannot be much reduced in consideration of the size of fingers of a user.

Recently, for the sake of theft prevention or of preventing juveniles from watching a particular channel of a CATV, there has existed a need for a particular key solution, and there has been an increasing demand for an electronic ID card and electronic money. A key solution for these various needs are determined individually and distinctively for each item, and, therefore, a user should carry each key solution. In addition, these key solutions cannot be applied to public purposes, e.g., a coin locker or other public facility.

DISCLOSURE OF THE INVENTION

It is, therefore, an object of the present invention to provide an electronic information key including a memory element for storing ID codes composed of a plurality of bytes as an unlock signal of a door.

Another object of the present invention is to provide an electronic information key system for controlling unlocking operation of a door by registering ID codes stored in a memory element of the electronic information key, reading out the ID codes stored in the electronic information key and comparing them to check if they are identical.

Another object of the present invention is to provide an electronic information key system for preventing from an unauthorized duplication of the key thereof by changing the ID codes stored in the electronic information key every time the key system is used.

Yet another object of the present invention is to provide an electronic information key system for preventing a malignant user from accessing the system by lengthening an allowable waiting time for unlocking of the system when the ID codes stored in the electronic information key do not match with the registered ID codes stored in the locking device thereof.

Still another object of the present invention is to provide an electronic information key system having a master key function. The master key enables the system to be usable in an emergency state for which a new power supply is applied after an exhaustion of a current power supply and enables any member in a group supervising a large facility to use the system.

In accordance with the present invention, there is provided an electronic information key system comprising at least one electronic information key and a locking device unlocked with the electronic information key, wherein the electronic information key including: an ID code storage having a plurality of memory areas, each storing different ID codes; a body, resin-treated, for installing the ID code storage; and a contact, mounted on the body and electrically connected to the ID code storage, and wherein the locking device including: a key holder for electrically contacting the contact of the electronic information key; a registered ID code storage for storing values corresponding to the ID codes stored in any one of the plurality of memory areas of the ID code storage of the electronic information key; and a controller for comparing the ID codes stored in an area of the ID code storage with the ID codes stored in the registered ID code storage to thereby verify whether the electronic information key is duly operating, when the contact electrically contacts the key holder.

BRIEF DESCRIPTION OF THE DRAWINGS

FIG. 5 shows a data mapping format of a registered ID code storage;

FIG. 6. presents an updating process executed in the controller for use in banning a malignant user;

FIG. 7 exemplifies a memory map of the registered ID code storage to show an ID code updating process;

DESCRIPTION OF THE PREFERRED EMBODIMENTS

A preferred embodiment in accordance with the present invention will now be described in detail with reference to FIGS. 1 to 9.

Figure 1:
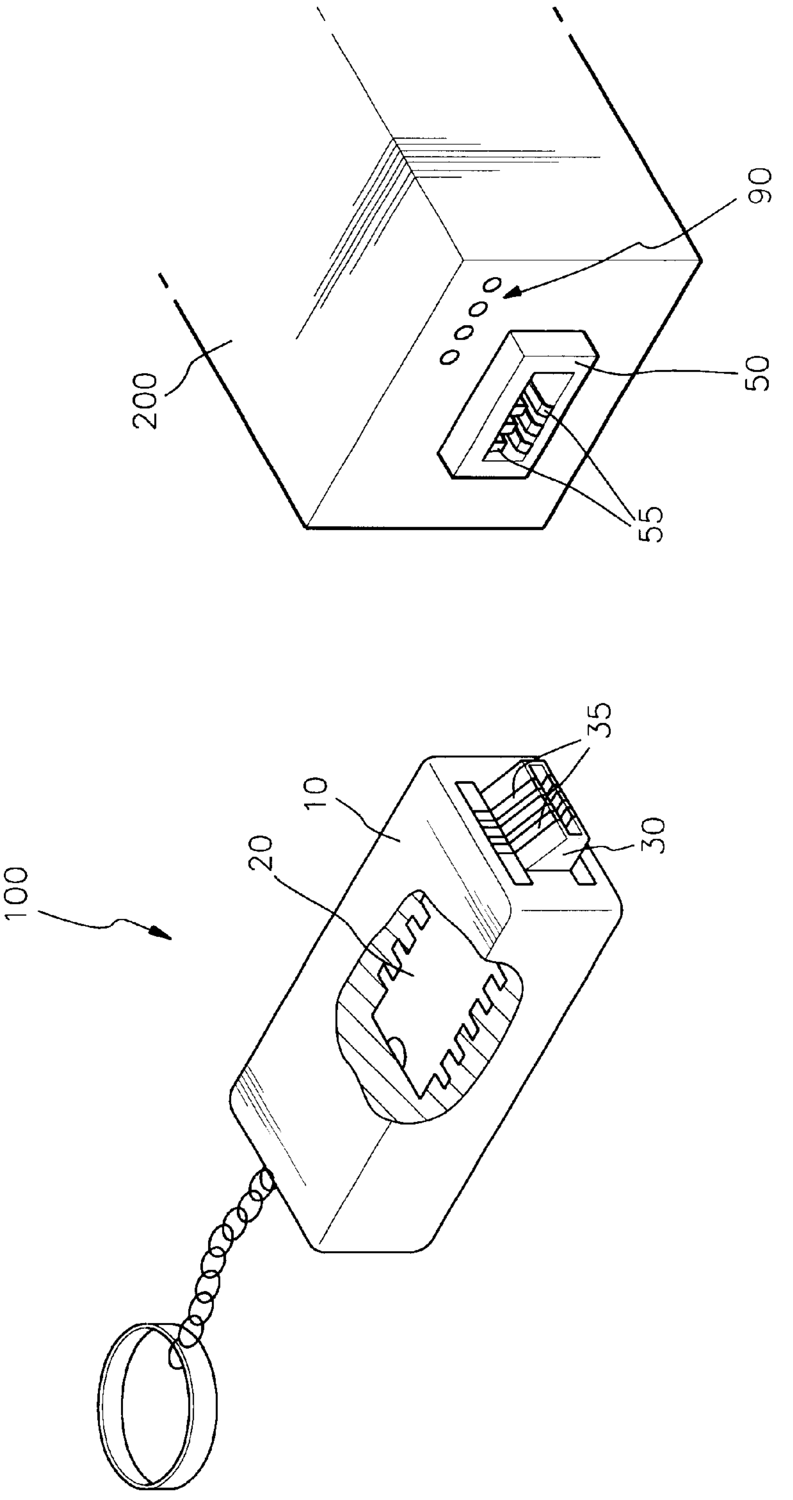
FIG. 1 depicts an electronic information key system having an electronic information key and a locking device in accordance with the present invention.

FIG. 1 depicts an electronic information key system having an electronic information key and a locking device in accordance with the present invention.

In the electronic information key 100, there is stored secret information, e.g., ID codes, for use in turning on/off of the locking device 200. The ID codes are used for providing an unlocking signal to the locking device 200. The electronic information key 100 includes a body 10 made of polymer resin such as PVC, an ID code storage 20, embedded in the body 10, for storing the ID codes used for turning on/off of the locking device 200, and a contact 30, installed at the front edge of the body 10, corresponding to pins of the ID code storage 20. The contact 30 matches with a key holder 50 of the locking device 200. When the contact 30 is set in the key holder 50, a plurality of stripes attached on the inner surface of the key holer 50 exactly match with a plurality of contact stripes 35 attached on the contact 30, which enables a data transfer between the electronic information key 100 and the locking device 200.

The ID code storage 20 is implemented with a non-volatile semiconductor memory such as an EPROM for electrically storing and erasing data, an EEPROM, having a window thereon, capable of writing and erasing upon an illumination of ultra-violet light or a flash memory in which data therein cannot be erased upon power-off. In case the EEPROM is used for the ID code storage 20, it stores the ID codes of 128 bytes, and, when the size of each ID code of the electronic information key 100 is defined as 4 bytes, by changing each bit in the ID codes stored in an area of the memory or by changing corresponding addresses, it is possible to implement an electronic information key having $2^8 \times 2^8 \times 2^8 \times 2^8 = 4{,}294{,}967{,}276$ distinct number of contents. In principle, these ID codes need not be a fixed value only if each code is distinct to others. It is also possible to implement the ID codes such that a user, not a manufacturer, is allowed to designate certain bits. The inventive key system includes an input means through which the user can directly designate any desired number as an ID code so that the electronic information key 100 can be implemented with storing the desired ID code.

Figure 2:
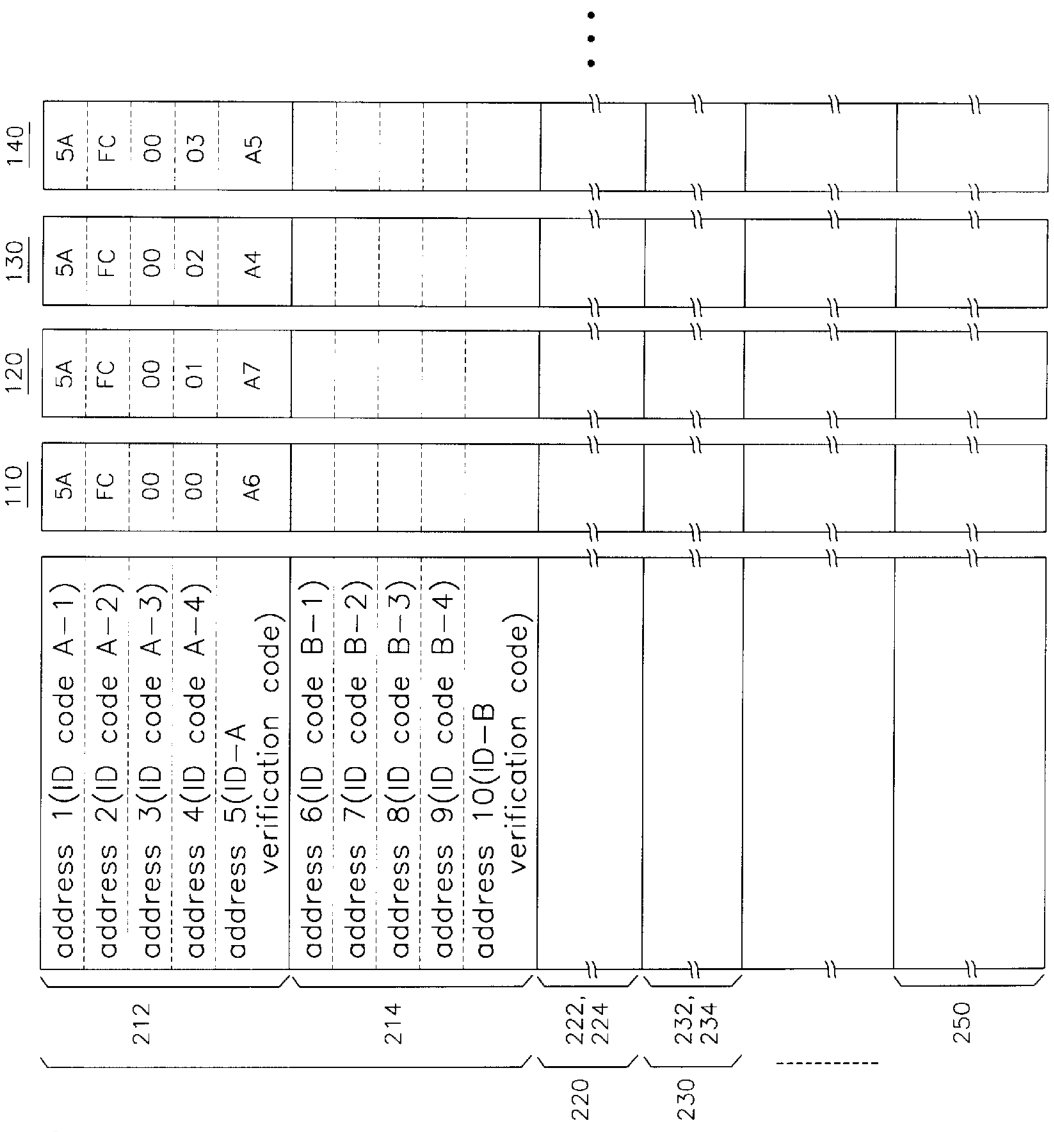
FIG. 2 presents an exemplary memory map of the ID code storage in the electronic information key.

FIG. 2 presents an exemplary memory map of the ID code storage 20 in the electronic information key 100. The EEPROM having a storage of 1K bytes which stores a plurality of 4 byte numbers, e.g., numbers increased by 1 from each of 5A, FC, 00, 00 (hexadecimal number), enables to implement N number of distinct information keys 110, 120, 130, 140. Stored in the ID code storage 20 are ID data and verification code corresponding the ID data. In accordance with the present invention, for example, the verification code is produced by XORing all the corresponding digits of each ID code.

The storage in each electronic information key 110, 120, 130, 140 is divided into a plurality of areas 210, 220, 230, etc., in order to use for entry restriction, use restriction and information access restriction, each having a locking device thereon, or for use in unlocking all the above items as a whole. In each of these storage areas, ID information corresponding to the entry restriction, the use restriction and the information access restriction, or needed for system operation is stored. The entry restriction means controlling entry through a door of an office or a home; use restriction means preventing an unauthorized person from gaining access to a safe, a personal locker or a car; and a theft prevention means that an electronic appliance does not enter into a usable state even if it is stolen.

Each ID code storage 210, 220, 230 is divided into two divisions 212, 214; 222, 224; and 232, 234, each storing more than two ID codes. In the preferred embodiment in accordance with the present invention, there are two divisions.

In detail, by reference to FIG. 2, in a first division 212, 222, 232 of the ID code storage 210, 220, 230, a first to a fourth address memories store ID codes A of 4 bytes, a fifth address memory stores a verification code corresponding to each ID codes A; and in a second division, 214, 224, 234 of the ID code storage 210, 220, 230, a sixth to a ninth address memories store ID codes B of 4 bytes, a tenth address memory stores a verification code corresponding to the ID codes B.

In accordance with the present invention, the ID codes stored in the ID code storage 210, 220, 230, upon completing an unlocking operation, are replaced with new ID codes through the process of generating a random number by using a currently effective ID code. That is, the random number is added to or subtracted by the current ID codes or the random number is logically added to or logically multiplied by the current ID codes to thereby produce the new ID codes. The new ID codes are stored in other area than the area in which the current ID codes are stored. The reason for storing the ID codes in different two divisions is to cope with the case that an unlocking is completed before the new ID codes produced through an updating process is stored in the ID code storage 20 of the electronic information key 100. That is, the new ID codes are stored in the other addresses than the addresses in which the current ID codes are stored, and the stored ID codes are read out. These two sets of ID codes are compared to check if they are identical and only when they are identical to each other, the current ID codes are nullified and the new ID codes are used as effective ID codes. When these ID codes are not identical to each other, connection is released before the storing of ID codes are performed or it is determined that an error has occurred in the course of data transfer, and, therefore, the current ID codes are utilized again.

Meanwhile, a storage area 250 of the ID code storage 20 may be used for storing a user's personal information.

Figure 3:
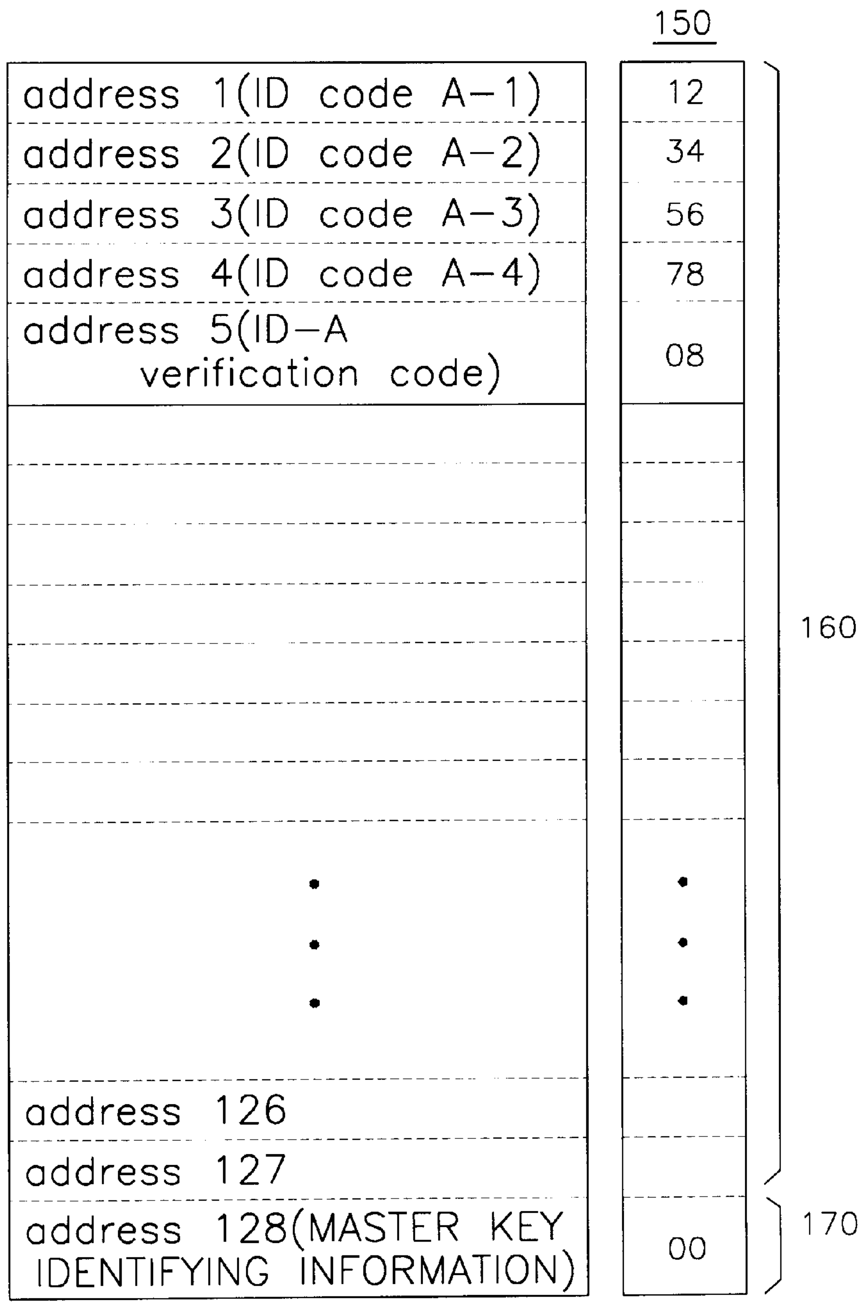
FIG. 3 illustrates a memory map of the ID code storage when the electronic information key is used as a master key.

FIG. 3 illustrates a memory map of the ID code storage 20 when the electronic information key 100 is used as a master key 150. The electronic information key 100 may be used as the master key 150 when an after service is required for the electronic information key 100 or when the key 100 is used a consolidated key for controlling access of a large size facility. In a memory element of the master key 150, area 160 is used for storing ID codes, area 170 stores data for determining whether an inserted key is the master key or not. For example, when the value of the area 170 is "00," the key is not the master key but when the value of the area 170 is "FF," the key is regarded as the master key.

Figure 4:
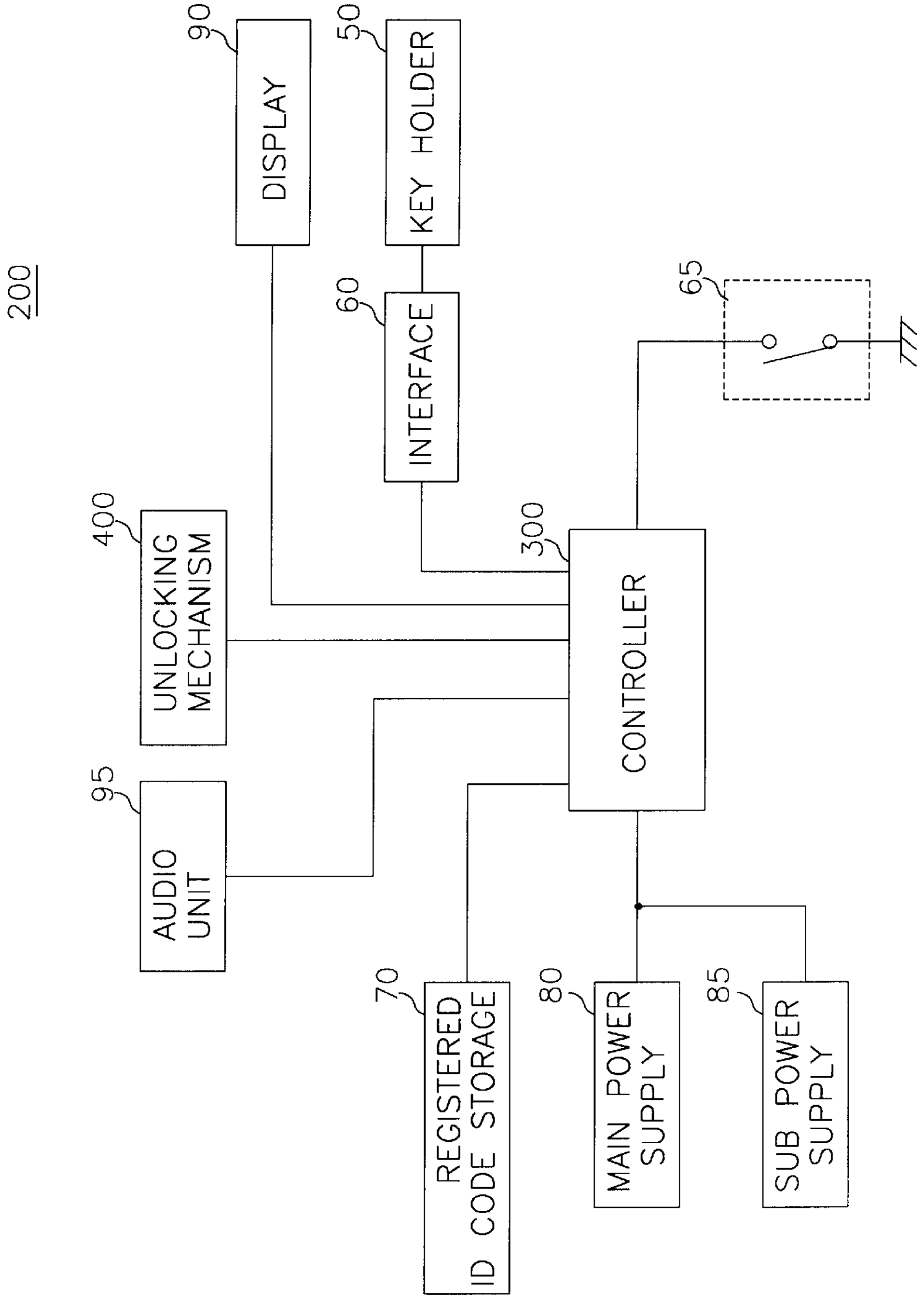
FIG. 4 shows in detail functional blocks of the locking device.

FIG. 4 shows in detail functional blocks of the locking device 200. The locking device 200 is designed for the entry restriction, the use restriction and the theft prevention, and includes the key holder 50, an interface 60, a mode switch 65, registered ID storage 70, a main power supply 80, a sub power supply 85, a display 90, an audio unit 95, controller 300 and locking mechanism 400.

The key holder 50, as shown in FIG. 1, is used matching with the electronic information key 100 and transferring data through the contact 35.

The interface 60 transfers data between the key holder 50 and the ID code storage 20.

The mode switch 65, connected to the controller 300, is a switch for use in first registering the ID codes of the electronic information key 100 in the registered ID code storage 70.

The registered ID code storage 70 is the same memory element as the non-volatile semiconductor memory installed in the electronic information key 100 and stores ID codes used for a particular group of users, for a particular purpose and for the master code associated with the master key.

The main power supply 80 and the sub power supply 85 supplies power to various blocks such as the controller 300 of the locking device, and when the main power supply 80 is off, the sub power supply 85 replaces the main power supply 80.

The display 90 is made of light emitting element such as LED or LCD, installed on top of the locking device 200, and displays the locking/unlocking operation of the locking device 200. The audio unit 95, made of, e.g., a piezoelectric speaker, outputs sound relating to the operation of the locking/unlocking operation of the locking device 200.

The controller 300, implemented with, e.g., a microcomputer, controls the whole operation of the electronic information key system. When the electronic key 100 is set in the key holder 50 of the locking device 200, the controller 300 reads out the ID codes in the registered ID code storage, registers the ID codes, and compares the registered ID codes and the ID codes stored in the electronic information key 100. If the ID codes being compared are identical to each other, on/off control of the system is performed and the ID codes of the ID code storage 20 is updated through a re-registration procedure of the electronic information key 100 or a stored program. If there is an attempt to open the system by a malignant, the controller 300 controls a waiting time for nullifying the input thereof. Master key data is stored when the key functions as the master key, the controller 300 controls the functions relating to the master function.

The locking mechanism 400 includes a mechanical or an electrical mechanism for making the electronic information key system on/off.

FIG. 5 shows a data mapping format of the registered ID code storage 70. The registered ID code storage 70 is divided into the registered ID code areas 710, 720, etc. in which the ID codes of the electronic information key 100 carried by each user belong to a user group are stored, an area for designating a start address of each ID code 712, 722, an area for storing the number of the registered ID codes 700 and an area for storing a master key verification code 732. In detail, in the memory map of FIG. 5, assuming the registered ID code storage 70 is an EEPROM of 1K capacity, two ID codes for two electronic information key 110, 120 are registered in the registered ID code area 710, 720; the number of ID codes is stored, e.g., “02” in (the first address of) the registered ID code number area 700; the master key ID codes “12-34-56-78” are stored in the addresses 124 to 127; and a verification code produced by XORing the master key codes are stored at the address 128.

The locking device 200 is designed so that the locking device 200 uses only the ID codes corresponding thereto among various storage area of the electronic information key 100. For example, in the ID code storage 20 of the electronic information key 100, provided that ID codes for entry restriction of an office or a home are stored in the first area 210; ID codes for access restriction to a safe, personal locker or a car are stored in the second area 220; ID codes for access restriction to a computer or a communication system are stored in the third area 230; and ID codes for theft prevention of electric appliances are stored in the other area. The locking system 200 in accordance with the present invention is used in a door locking system, the locking device 200 is programmed such that it utilizes only the ID codes stored in the first area of the ID code storage 20 of the electronic information key 100. In the same manner, when the locking device 200 is used for the safe, it is programmed such that it utilizes only the ID codes stored in the second area of the ID code storage 20 of the electronic information key 100. Therefore, only a single electronic information key 100 is needed for adaptively applied various locking systems, i.e., the key 100 can be used as a universal key.

Meanwhile, once the controller 300 assigns an appropriate value in the area 700 of the registered ID code storage 70 and when a registration process for a door key is completed, the controller 300 checks if the electronic information key is newly used by changing the value of the area 700. This, as described above, is to cope with a situation when even the sub power supply is run out. Therefore, since a manufacturer can put a value “00” in the area 700 when the key system is originally fabricated and design it such that it allows the value stored in the area 700 to be changed upon the completion of an input of the ID codes, upon completion of a verification of the ID codes or upon completion of input of new ID codes, the corresponding area may be searched after a power supply is newly applied. In this case, when the value of the area 700 is “00,” it is regeared as a new use so that all the registered ID codes are not effective; and when the value of the area 700 is not “00,” the ID codes already stored in the registered ID code storage 70 per se is to be used since it is determined as an urgency state or a reuse case.

FIG. 6 presents an updating process executed in the controller 300 for use in prevention of a malignant user.

Originally, ID codes are registered in the electronic information key 100. Whenever the key is used for unlocking, the ID codes stored in different areas of the ID code storage 20 of the electronic information key 100 are retrieved, it is checked as to whether there are already registered ID codes in each area thereof. If it is determined that there is the already registered ID code, it is checked if both start addresses match with each other. If one address matches with the other, it is determined that the ID codes are the already registered ID code and the ID code is updated for further use.

The updating process of ID codes may be performed such that a random number is generated by applying operations of adding, subtracting, multiplying or dividing to the existing ID codes with the random number to thereby irregularly generate new ID codes. One of the updating processes is to use, for example, a habitual behavior of the user in connection with the use of the electronic information key. This can be implemented, e.g., by measuring time while the electronic information key 100 is contacting the key holder 50 of the locking device 200 and by using this time in the adding or multiplying. Herein, since this time need not be an absolute time but has only to be appropriate for generating a random number, a CPU clock count may be used for this purpose. As an another example, provided that the key in accordance with the present invention is a car key, the updating can be implemented by generating a random number based on the user's habit or an ignition count, which even the original designer of the key system cannot predict, not by using conventional manner such as increasing a number at a regular interval starting from the ignition of the engine of the user to the stopping thereof. A series of verification process is performed such that the new ID codes generated by using the above methods are stored in the electronic information key 100 connected to the locking device 200 and the stored ID codes are retrieved to be compared with the former ID codes. If the comparison result proves that the retrieved ID codes match with the former ID codes, it is determined that the ID code verification is successfully performed. Subsequently, unlocking is performed for the entry restriction or the use restriction. At the same time, the new ID codes are stored by attaching the start address thereof in the registered ID code storage 70. In performing the updating process described above, the reason for assigning two areas (the first to the fifth addresses and the sixth to the tenth addresses) to the ID code storage 20 of the electronic information key 100 is to prevent, as described above, the user from releasing the key contact prior to storing the new ID codes. Therefore, by storing the new ID codes in other area (an area with different start address) than the area in which the current ID codes are stored, the current ID code is kept for further use even when the updating process does not end successfully.

FIG. 7 exemplifies a memory map of the registered ID code storage 70 to show the ID code updating process. In FIG. 7, there is shown an exemplary memory map of the registered ID code storage 70 when two ID codes are originally stored for each of the two electronic information keys 110 and 120 shown in FIG. 2 in the ID code storage 70 and assuming the electronic information key 120 has been used three times. To facility understanding of this memory map, the adding procedure is shown as below.

$$\begin{array}{rr} & 5AFC0001(HEX) \\ + & 0311393C(HEX) \\ \hline & 5E0D393D(HEX) \\ EOR & 7309A172(HEX) \\ \hline & 2D04984F(HEX) \end{array}$$

$$\begin{array}{rr} & 2D04984F(HEX) \\ + & 0311393C(HEX) \\ \hline & 3015D1813(HEX) \\ EOR & 7309A172(HEX) \\ \hline & 431C70F9(HEX) \end{array}$$

$$\begin{array}{rr} & 431C70F9(HEX) \\ + & 0311393C(HEX) \\ \hline & 462DAA35(HEX) \\ EOR & 7309A172(HEX) \\ \hline & 35240B47(HEX) \end{array}$$

FIG. 7(*b*) shows modified ID codes after once used, FIG. 7(*c*) shows modified ID codes after twice used, FIG. 7(*d*) shows an example that the current ID code remains unchanged in the storage 70 as a result of failure of updating ID codes after twice used. FIG. 7(*e*) shows the ID code altered after the state of FIG. 7(*d*).

The operation of the electronic information key system in accordance with the present invention will now be described.

Figure 8:
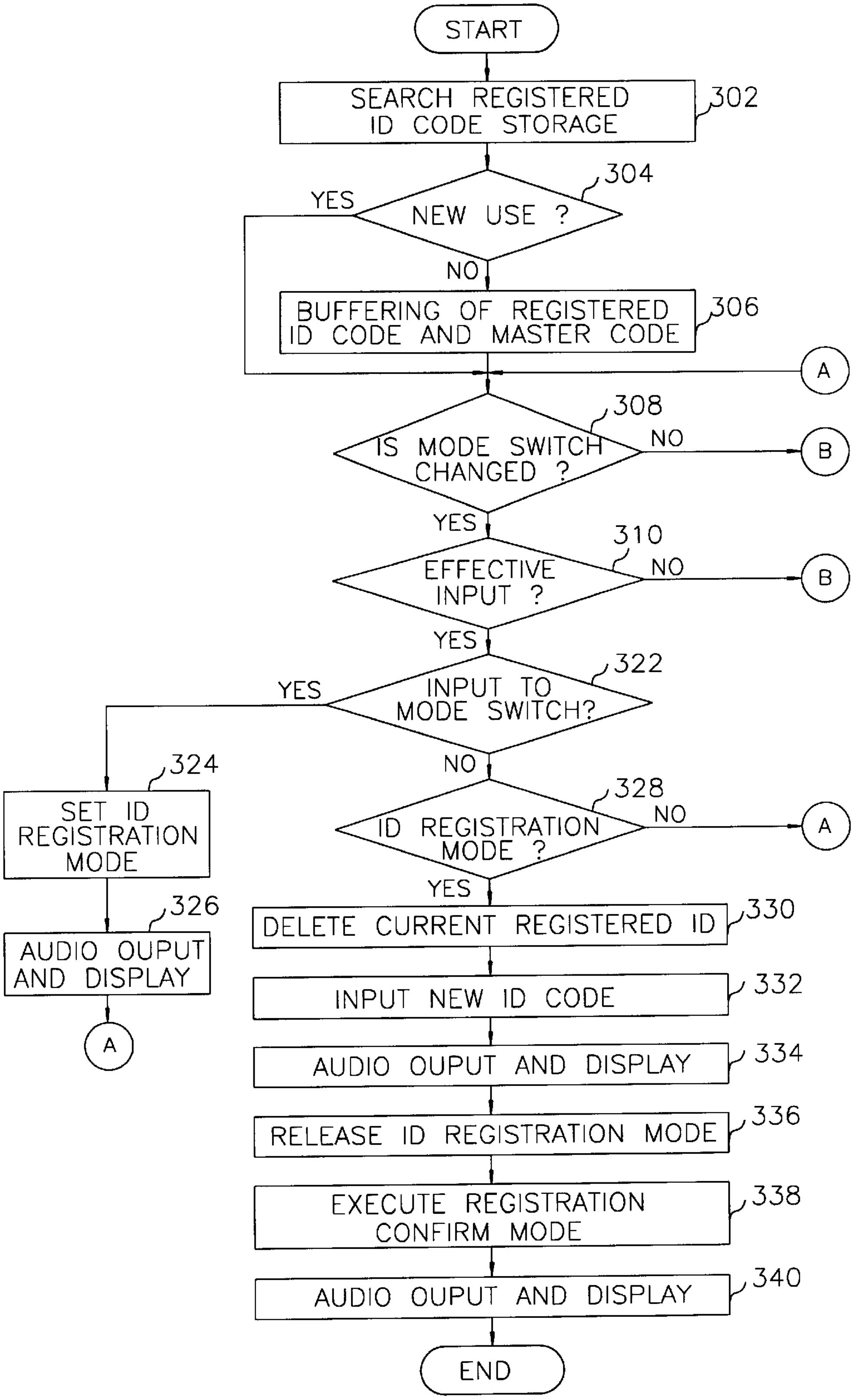
FIG. 8 is a flow diagram illustrating a process of verifying a usability after application of a power supply and a process of registering the ID codes stored in the ID code storage to the registered ID code storage.
Figure 8:
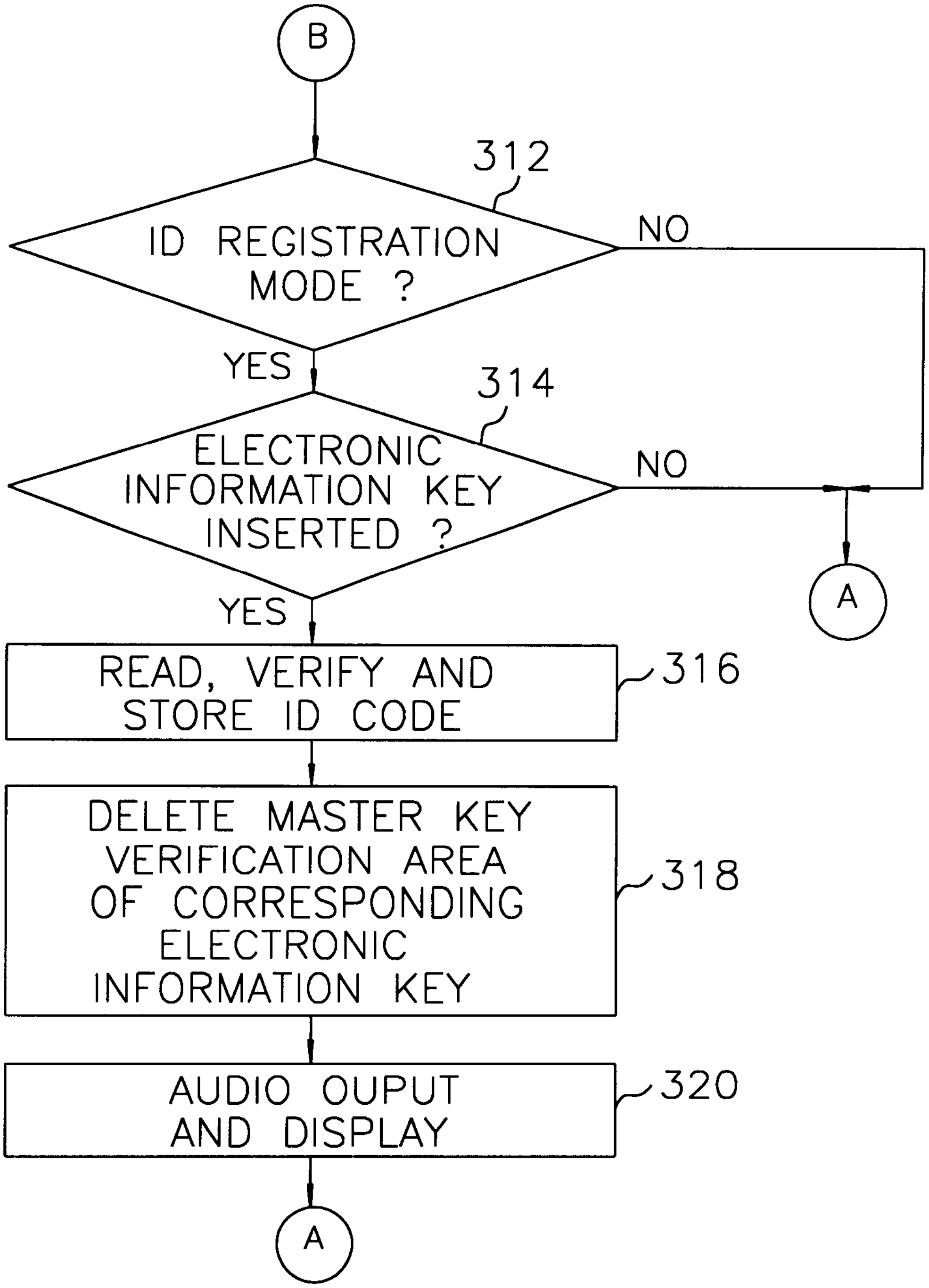

FIG. 8 is a flow diagram illustrating a process of verifying a usability after application of a power supply and a process of registering the ID codes stored in the ID code storage 20 of the electronic information key 100 to the registered ID code storage 70 of the locking device 200.

At steps 302 to 306, upon applying a power supply, a certain area of the ID code storage 20, e.g., the area for storing the number of the registered ID codes 700, are searched. If the value of this area 700 remains unchanged as compared with that as of original manufacturing, it is determined that it is a new use without any registered ID codes, the procedure goes to step 308. Meanwhile, unless the value of this area 700 remains unchanged as compared with that as of original manufacturing, it is determined that it is a reuse, and, subsequently, the ID codes stored in an area of the ID code storage 20 or the master key are temporarily stored to thereby being ready to be substituted for the current ID codes.

At steps 308 and 310, the controller 300 determines whether effective data is inputted upon completion of chattering of the mode switch 65. If there is no effective data from the mode switch 65 (step 310), and the controller 300 determines that the current state is not an ID code registration mode (step 312), the procedure returns to step 308 via tap A. If there is the effective data from the mode switch 65, and the mode switch is on (step 322), the ID code registration mode in order to register the ID codes of the electronic information key 100 corresponding to the system on which the locking device 200 is installed is set (step 326). At steps 312 and 314, the electronic information key 100 is set in the key holder 50 of the locking device 200.

At step 314, if it is determined that the electronic information key 100 is set in the key holder 50, the procedure goes to step 316 where the ID codes stored in the electronic information key 100 is retrieved via the interface 60. These retrieved ID codes are registered in the registered ID code storage 70 at an area designated by address as shown in FIG. 4.

If the ID code registration with respect to a certain electronic information key 100 is completed through the above procedure, the controller 300 makes the audio unit 95 output a sound or the display 90 show results indicating the completion of the ID code registration (step 318 and 320). After step 320, the procedure returns to step 308, from which the above described registration procedure for another electronic information key is repeated. By repeating this procedure, the ID code registration with respect to a plurality of electronic information keys 110, 120, 130, 140, e.g., owned by group users can be completed.

At step 322, if the mode switch 65 becomes open after the ID code registration with respect to the plurality of electronic information keys 110, 120, 130, 140, the ID codes already stored in the registered ID code storage 70 are deleted (step 330), newly inputted ID codes and the count thereof are newly stored (step 332) and the corresponding ID code registration mode is finished, and, finally, the ID code registration procedure ends (step 336).

When the ID code registration mode is completed, at step 338 and 340, the controller 300 enables the display 90 to enter into a display mode in which the display 90 shows, e.g., the number of currently registered electronic information keys to the user during a predetermined time period.

Figure 9:
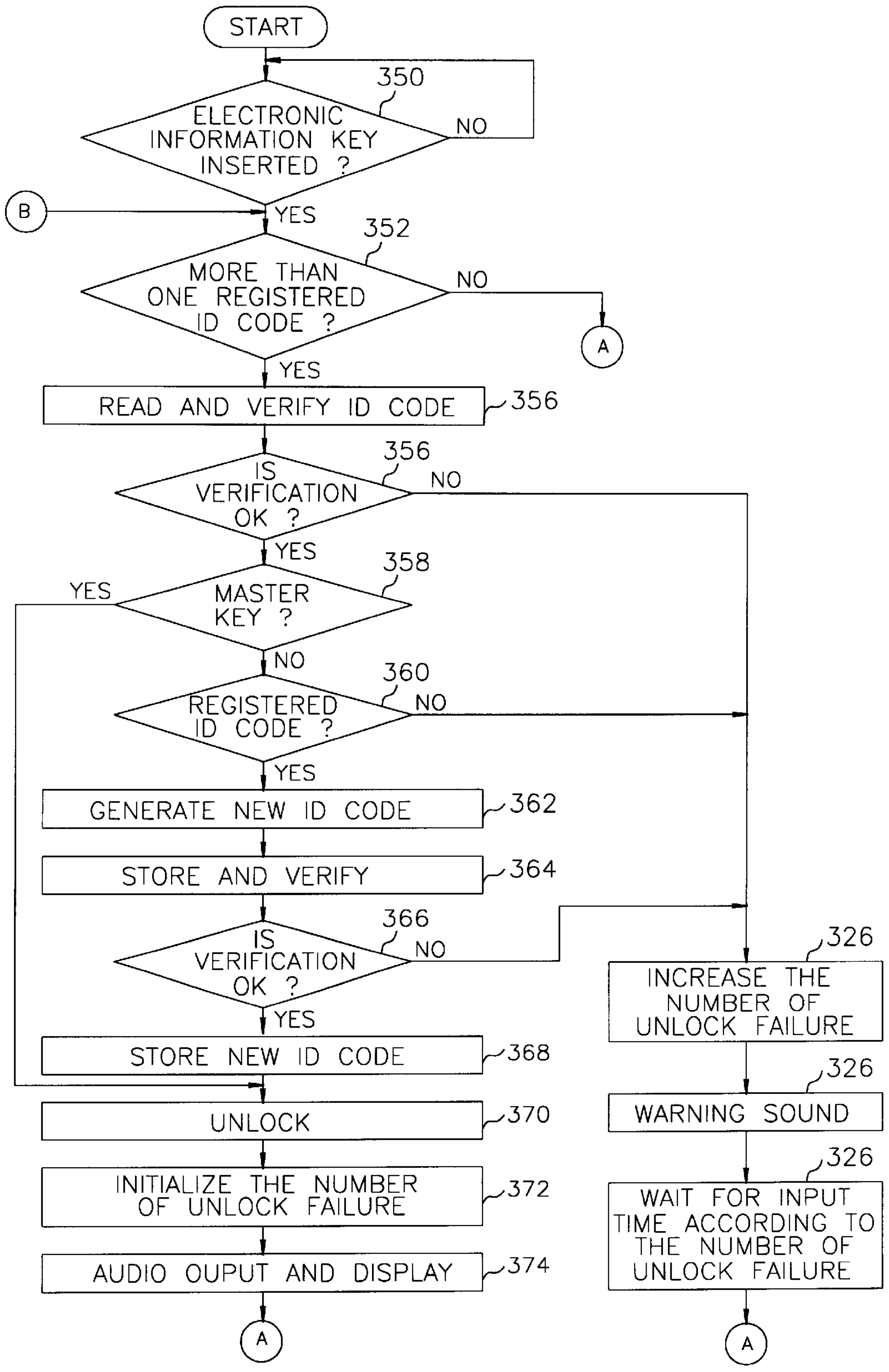
FIG. 9 is a flow diagram presenting an unlocking procedure of the electronic information key system, provided that at least one electronic information key is registered on the locking device.

FIG. 9 is a flow diagram presenting an unlocking procedure of the key system installing the locking device 200, once at least one electronic information key 100 is registered on the locking device 200.

At step 350, the controller 300 determines whether the electronic information key 100 is inserted in the key holder 50 of the locking device 200. If the key 100 is determined to be inserted in the key holder 50 and if there is more than one registered ID code (step 352), the controller 300 retrieves the ID codes from the electronic information key 100 through the contact 35 and the interface 60 and verifies the ID codes. If the controller 300 determines that the key 100 is a master key, the unlocking operation is performed at step 370. In the above, the controller 300 retrieves the ID codes of the electronic information key 100 at least twice, performs XORing these ID codes, compares the result with the verification code corresponding thereto and checks if the retrieved data is in order to thereby perform control based on the normal ID codes.

At step 358, if the inserted electronic information key 100 is not a master key, the controller 300 checks if the retrieved ID codes match with the ID codes already registered during the ID code registration process, i.e., performs search on the content of the ID code and the address thereof (step 360). If the ID codes match with each other, the input from the electronic information key 100 is invalidated and the display 90 and audio unit 95 alarm an unauthorized access (step 378), and, at the same time, the controller 300 doubles the input waiting time during which any input from the electronic information key 100 is ignored (step 380). This procedure is also applied when, at step 356, there is no decent input from the electronic information key 100 during a prescribed time period.

At step 360, if decent ID codes are inputted from the electronic information key 100, the procedure proceeds to steps 362 and 364.

The controller 300 generates a random number; by using this random number, performs adding, subtracting, multiplying and dividing with respect to the ID codes to thereby generate new ID codes (step 362); stores the new ID codes in an area other than the area where current effective ID codes are stored in the ID code storage 20 of the inserted electronic information key 100; retrieves the ID codes in each area; determines whether these two ID codes are identical or not; and performs verification that checks if there is an error in writing the new ID codes (step 364). At step 366, if the verification results in no error, the procedure goes to step 368 where the new ID codes and the start address thereof are written in the ID code storage 70, to thereby effectuate the new ID codes, and, at the same time, the current ID codes are made invalidated and the procedure goes to step 370.

At step 370, the controller 300 makes the unlocking mechanism 400 to operate.

Though the above description presents a preferred embodiment of the present invention, various modified embodiments can be made. For example, assuming the present invention is used for the entry restriction, the use restriction and the access restriction with respect to a safe, it is possible to implement a trace key for tracing the used data of a former user. The word trace presents, e.g., a process that identifies former users including the last user. For example, in accordance with the trace key, each system has its own password. When a key having this password is applied to the system, history of the former users may be displayed with an external display device, independent of an unlocking operation. Each and every time an electronic information key is used, the controller of the locking device stores the once used ID codes of each electronic information key in designated areas of the ID code storage. It may be designed so that the information on the last used ID codes may be displayed when the trace key is inserted in the locking device. Herein, in accordance with the above trace type, all the information on the former users may not be stored, but a part thereof may be stored to thereby reduce the size of the ID code storage.

In detail, as an example of the trace type, assuming users registered to a safe system are A, B, C, D and E, respectively and these users have made use of the safe system in a sequence of C→C→A→A→B→E→D→D→D→D→E→A→A→C→C→C→D→B, the system compares the current user and the last user. The memory size can be reduced by storing the information only if the two users are different from each other. In the above event, the user information stored is CABEDEACDB. Provided that this user information is traced back five times, by using the above user information, it can be determined that the safe system is robbed in the state that the current user has opened the safe. The former users can be traced back to indicate a sequence of D→C→A→E.

Further, as an alternative of the present invention, so-called test key can also be implemented. Car audio theft is the example. It may be designed that the key system is operated only by inserting the key in accordance with the present invention once the car audio is originally installed. In this event, since the key must be fabricated to be exactly matched with the system in the final test stage of mass production thereof, there must exist difficulties in manufacture and management. The test key has the advantage to overcome these difficulties. A key password is assigned in a similar manner as the above trace type. This test key is made to be effective only during a prescribed time period which is enough to complete desired test, e.g., 10 minutes. In the above, in the course of the fabrication and the use of the key, it should be avoided that the data of the trace key and the data of the test key are not inputted to the key from a random number generator therein.

The keys in accordance with the present invention has such features as easy-to-carry, small, simple for design, etc. over the conventional mechanical counterpart since the memory employed in the keys are small as nail size and very light, which makes the keys easily applicable to such a locking system the size of which is severely restricted as a car locking system. Furthermore, a user have only to "insert and push" instead of "insert and turn," and, therefore, any user can operate the keys very easily.

In accordance with the electronic information key and the control system thereof, the electronic information key includes a non-volatile ID code memory storing ID codes and the ID codes are registered to a locking device to which the electronic information key and the ID codes are to be applied. This has advantages over a conventional mechanical locking system and a conventional electronic locking system. For instance, it is easy to use as the conventional mechanical system and it is more secure than the conventional electronic system since it is extremely difficult to detect the password thereof. For example, even though an attempted theft tries to duplicate the inventive electronic information key, the ID codes registered in the locking device is altered whenever the key is used and the former ID codes are automatically invalidated. Accordingly, the present invention is free from the duplication problem of conventional key system. Further, maintenance cost can be saved by using the above-described the master key function.

What is claimed is:

1. An electronic information key system comprising at least one electronic information key and a locking device unlocked with the electronic information key, wherein the electronic information key including:

an ID code storage having a plurality of memory areas, each storing different ID codes;

a body, resin-treated, for installing the ID code storage; and a contact, mounted on the body and electrically connected to the ID code storage, and wherein the locking device including:

a key holder for electrically contacting the contact of the electronic information key;

a registered ID code storage for storing values corresponding to the ID codes stored in any one of the plurality of memory areas of the ID code storage of the electronic information key; and a controller for comparing the ID codes stored in an area of the ID code storage with the ID codes stored in the registered ID code storage to thereby verify whether the electronic information key is duly operating, when the contract electrically contacts the key holder, wherein the controller authenticates the ID codes read from the electronic information key, generates new ID codes by using the ID codes and a certain variable, and, subsequently, the new ID codes are stored as updated ID codes in the electronic information key and stored as the registered ID codes in the locking device, and wherein the variable is generated based on the time duration that the electronic information key contacts the locking device.

2. The electronic information key system of claim 1, wherein the ID code storage of the electronic information key has ID code storing areas for storing at least two sets of ID codes.

3. The electronic information key system of claim 1, wherein the ID codes include therein ID code data and verification data for use in a verification thereof.

4. The electronic information key system of claim 1, wherein ID code registration area of the registered ID code storage further includes an area for storing the place of the ID codes in the ID code storage of the electronic information key.

5. The electronic information key system of claim 4, wherein the authentication of the controller is performed such that the ID codes stored in the ID code storage of the electronic information key are compared with the registered ID codes stored in the registered ID code storage, and the area for storing the place of the ID codes are compared with an area for storing the place of the registered ID codes.

6. The electronic information key system of claim 1, wherein the registered ID code storage further includes a registered ID number area for storing the number of the registered ID codes.

7. The electronic information key system of claim 1, wherein the electronic information key includes a master key for use in consolidated management of a large facility, wherein the ID code storage of the master key has an area for storing ID codes and an area for storing the authentication information for the master key.

8. The electronic information key system of claim 1, wherein the electronic information key is a key for accessing a safe and the locking device is a locking device of the safe.

9. The electronic information key system of claim 8, wherein the electronic information key includes a trace key for use in detecting the last user of the locking device, the ID codes stored in the ID code storage of the trace key having trace codes, the controller of the locking device, as of the authentication of the electronic information key, stores each ID code data corresponding to each user every time the locking device is used and displays the number corresponding to the last user based on the ID code data.

10. The electronic information key system of claim 1, wherein the electronic information key is a key for accessing a car and the locking device is a locking device of the car for use in a use restriction.

11. The electronic information key system of claim 1, wherein the electronic information key is a key for accessing a door and the locking device is a locking device of the door for use in an entry restriction.

12. The electronic information key system of claim 1, wherein the electronic information key has a key for theft prevention key of an electronic appliance and the locking device is a locking device of the electronic appliance for use in a use restriction.

13. The electronic information key system of claim 1, wherein the electronic information key has a test key for use in manufacture, management and test of an electronic appliance, the locking device is usable until the completion of the manufacture, management and test.

14. The electronic information key system of claim 1, wherein the electronic information key is a key for accessing an information communication system and the locking device is a locking device of the information communication system for use in an information access restriction.

15. An electronic information key system comprising at least one electronic information key and a locking device unlocked with the electronic information key, wherein the electronic information key includes:

an ID code storage having a plurality of memory areas, each storing different ID codes;

a body, resin-treated, for installing the ID code storage; and a contact, mounted on the body and electrically connected to the ID code storage, and wherein the locking device includes:

a key holder configured to electrically contact the contact of the electronic information key;

a registered ID code storage for storing values corresponding to the ID codes stored in any one of the plurality of memory areas of the ID code storage of the electronic information key; and a controller for comparing the ID codes stored in an area of the ID code storage with the ID codes stored in the registered ID code storage to thereby verify whether the electronic information key is duly operating, when the contact electrically contacts the key holder, wherein the electronic information key includes a trace key for use in detecting the last user of the locking device, the ID codes stored in the ID code storage of the trace key having trace codes, and the controller of the locking device, as of the authentication of the electronic information key, stores each ID code data corresponding to each user every time the locking device is used and displays the number corresponding to the last user based on the ID code data.

16. The electronic information key system of claim 15, wherein the ID code storage of the electronic information key has ID code storing areas for storing at least two ID codes.

17. The electronic information key system of claim 15, wherein the controller authenticates the ID codes read from the electronic information key, generates new ID codes by using the ID codes and a certain variable, and, subsequently, the new ID codes are stored as updated ID codes in the electronic information key and stored as the registered ID codes in the locking device, the updated ID codes being stored in another area than the ID codes have been stored, and wherein the variable is generated based on the time duration that the electronic information key contacts the locking device.

18. The electronic information key system of claim 15, wherein ID codes includes therein ID code data and verification data for use in a verification of the ID codes.

19. The electronic information key system of claim 15, wherein the registered ID code storage further includes a registered ID number area for storing the number of the registered ID codes.

20. The electronic information key system of claim 17, wherein ID code registration area of the registered ID code storage further includes an area for storing the place of the ID codes in the ID code storage of the electronic information key.

21. An electronic information key system comprising at least one electronic information key and a locking device unlocked with the electronic information key, wherein the electronic information key includes:

a body;

an ID code storage in the body, the ID code storage having a plurality of memory areas, each storing different ID codes; and a contact mounted on the body and electrically connected to the ID code storage, and wherein the locking device includes:

a key holder configured to electrically contact the contact of the electronic information key to thereby enable data transfer between the electronic information key and the locking device;

a registered ID code storage for storing values corresponding to the ID codes stored in any one of the plurality of memory areas of the ID code storage of the electronic information key; and a controller for comparing the ID codes stored in an area of the ID code storage with the ID codes stored in the registered ID code storage to thereby verify whether the electronic information key is duly operating, when the contact electrically contacts the key holder, wherein the controller generates at least one new ID code based at least in part on a variable based on the time duration that the electronic information key contacts the locking device.

* * * * *